United States Patent [19]

Pottebaum

[11] Patent Number: 5,666,239
[45] Date of Patent: Sep. 9, 1997

[54] LAMINATED BASE DECK FOR A DISC DRIVE

[75] Inventor: Kenneth L. Pottebaum, Yukon, Okla.

[73] Assignee: Seagate Technology, Inc., Scotts Valley, Calif.

[21] Appl. No.: 671,703

[22] Filed: Jun. 28, 1996

Related U.S. Application Data

[60] Provisional application No. 60/008805, Dec. 14, 1995.

Related U.S. Application Data

[63] Continuation-in-part of Ser. No. 671,704, Jun. 28, 1996.
[51] Int. Cl.$^6$ .................................................. G11B 33/08
[52] U.S. Cl. .............................. 360/97.03; 360/98.01; 361/685; 428/625
[58] Field of Search .................... 360/97.01–98.01, 360/98.07, 99.08; 369/75.1; 361/685; 428/625

[56] References Cited

U.S. PATENT DOCUMENTS

| | | | |
|---|---|---|---|
| 5,147,691 | 9/1992 | Shimamoto et al. | 360/97.02 |
| 5,149,048 | 9/1992 | Morehouse et al. | 360/97.02 |
| 5,164,542 | 11/1992 | Hart | 174/35 MS |
| 5,214,549 | 5/1993 | Baker et al. | 360/97.02 |
| 5,235,482 | 8/1993 | Schmitz | 360/97.02 |
| 5,282,100 | 1/1994 | Tacklind et al. | 360/97.02 |
| 5,426,562 | 6/1995 | Morehouse et al. | 361/685 |
| 5,469,311 | 11/1995 | Nishida et al. | 360/97.02 |
| 5,510,954 | 4/1996 | Wyler | 361/685 |
| 5,546,250 | 8/1996 | Diel | 360/97.02 |
| 5,552,209 | 9/1996 | McCutcheon | 428/209 |

FOREIGN PATENT DOCUMENTS

| | | | |
|---|---|---|---|
| 63-204580 | 8/1988 | Japan | 360/97.02 |
| 2-139781 | 5/1990 | Japan | 360/97.02 |
| 3-83281 | 4/1991 | Japan | 360/97.02 |
| 4-232685 | 8/1992 | Japan | 360/97.02 |

*Primary Examiner*—Jefferson Evans
*Attorney, Agent, or Firm*—Bill D. McCarthy; Edward P. Heller, III; Randall K. McCarthy

[57] ABSTRACT

A laminated base deck for a disc drive comprising a base portion and side walls extending from the base portion. The side walls mate with a top cover to provide a sealed environment for the disc drive and the base portion supports a disc drive spindle motor and actuator assembly. The base portion and side walls comprise a laminate including an interior structural layer, an exterior structural layer and a core layer disposed between the interior and exterior structural layers, wherein the structural layers provide mechanical support for the disc drive and the core layer provides improved damping of vibrations generated by the operation of the spindle motor and the actuator assembly.

18 Claims, 5 Drawing Sheets

LAMINATED BASE DECK FOR A DISC DRIVE

CROSS REFERENCE TO RELATED APPLICATION

This application is a continuation-in-part of U.S. patent application Ser. No. 08/671,704 filed Jun. 28, 1996, entitled LOW SWAY SPACE CHASSIS FOR A DISC DRIVE, assigned to the assignee of the present invention and hereby incorporated by reference, and claims priority to U.S. provisional application Ser. No. 60/008,805 filed Dec. 14, 1995.

BACKGROUND OF THE INVENTION

1. Field of the Invention

This invention relates generally to the field of disc drive storage devices, and more particularly, but not by way of limitation, to a laminated base deck design for a disc drive.

2. Discussion

Disc drives are commonly used in workstations, personal computers, portables and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extend generally circumferentially around the discs and store data in the form of magnetic flux transitions within the radial extent of the tracks on the disc surfaces. Typically, each data track is divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head includes a slider assembly having an air bearing surface that causes the head to fly over the data tracks of the disc surface due to fluid air currents caused by rotation of the disc.

Typically, several discs are stacked on top of each other and the surfaces of the stacked discs are accessed by the heads mounted on a complementary stack of actuator arms which compose an actuator assembly, or "E-block". The E-block generally includes head wires which conduct electrical signals from the heads to a flex circuit, which in turn conducts the electrical signals to a printed circuit board (PCB) mounted to a disc drive base deck.

As will be recognized, the general trend in the industry is to provide disc drives with ever decreasing form factors and ever increasing storage capacities. Along with increases in spindle motor rotation speeds, areal density of recorded data and faster data access times by disc drive actuator assemblies, customer expectations further include continued reductions in the level of acoustic emissions generated by modern disc drives.

Acoustic noise from a drive is typically generated from resonant vibrations induced in the disc drive top cover and base deck by the operation of the spindle motor and the actuator assembly. A variety of methodologies have been employed to reduce acoustic emissions from disc drives; see for example U.S. Pat. No. 5,475,545 entitled METHOD FOR REDUCING NOISE DURING SEEKS IN A HARD DISC DRIVE issued Dec. 12, 1995 to Hampshire et al., which discloses shaping the velocity profile of an actuator assembly during the acceleration phase of a seek to reduce acoustic noise generated by the seek. Additionally, see co-pending U.S. patent application Ser. No. 08/671,704 entitled LOW SWAY SPACE CHASSIS FOR A DISC DRIVE which discloses the use of an external chassis and vibro-acoustic isolator to reduce acoustic emissions from the drive. Both of these references are assigned to the assignee of the present invention and are incorporated by reference.

A disc drive base deck is typically designed to provide the necessary structural integrity to support the mounting of internal disc drive components as well as to support attachment of the disc drive to a user environment (such as a disc drive bay in a PC). Typically, modern disc drives have base decks which are formed from a casting process using a suitable alloy material and undergo secondary machining operations as required to provide the requisite critical surfaces for proper alignment of the disc drive components. While structurally solid, such cast base decks have been found to be susceptible to high frequency vibrations, resulting in the generation of undesirable acoustic noise during operation of the drive.

There is a need, therefore, for an improved disc drive base deck design which provides the necessary structural integrity to facilitate the mounting and support of internal disc drive components as well as the mounting of the disc drive to a user environment, while at the same time having a reduced susceptibility to high frequency vibrations.

SUMMARY OF THE INVENTION

The present invention comprises a laminated base deck for a disc drive. The laminated base deck includes a base portion and side walls extending from the base portion. The side walls mate with a top cover to provide a sealed environment for the disc drive and the base portion supports a disc drive spindle motor and actuator assembly.

The base portion and side walls are formed using a deep draw process from a sheet of laminate having an interior structural layer, an exterior structural layer and a core layer disposed between the interior and exterior structural layers. The structural layers provide mechanical support for the disc drive and the core layer provides improved damping of vibrations generated by the operation of the spindle motor and the actuator assembly.

In one aspect of the invention, the laminated base deck is secured to a user environment (such as a disc drive bay in a PC) by way of a chassis mounted to the exterior surface of the laminated base deck. The chassis includes inwardly directed flanges to strengthen the chassis and accommodate a disc drive printed circuit board. Moreover, the inwardly directed flanges include tapped holes to accommodate hardware used to mount the disc drive in a user environment. The chassis can be a one-piece chassis comprising a c-shaped member with a chassis base portion substantially the same shape as the base portion of the laminated base deck and wherein the inwardly directed flanges extend from selected edges of the chassis base portion. Alternatively, the chassis can be a two-piece chassis comprising a pair of rails, with each rail including a vertical portion aligned with and secured to selected surfaces of the side walls of the laminated base deck and a base deck flange extending from the vertical portion and aligned with the base portion of the laminated base deck.

In another aspect of the invention, the laminated base deck is provided with threaded standoffs which are inserted into the laminated base deck at selected locations, the threaded standoffs serving to secure the base deck to the user environment. Additionally, solid standoffs can be inserted into the laminated base deck at selected locations to support the base deck relative to the user environment.

An object of the present invention is to improve the vibro-acoustic performance of a disc drive assembly.

Still another object is to isolate the disc drive assembly from the effects of internal and external vibrations.

Yet another object is to reduce acoustic emissions from the disc drive.

Another object is to provide an improved laminated disc drive base deck having generally the same overall dimensions as prior art cast formed base decks.

Other objects, advantages and features of the present invention will be apparent from the following description when read in conjunction with the drawings and appended claims.

BRIEF DESCRIPTION OF THE DRAWINGS

FIG. 8 is a cross-sectional view of the disc drive of FIG. 7, showing in greater detail the mounting of the drive in the user environment.

FIG. 9 provides a threaded standoff inserted into the laminated base deck of the disc drive of FIG. 1 to accommodate the mounting of the drive in the user environment.

FIG. 10 provides a solid standoff inserted into the laminated base deck of the disc drive of FIG. 1 to accommodate the mounting of the drive in the user environment.

DETAILED DESCRIPTION OF THE PREFERRED EMBODIMENT

Figure 1:
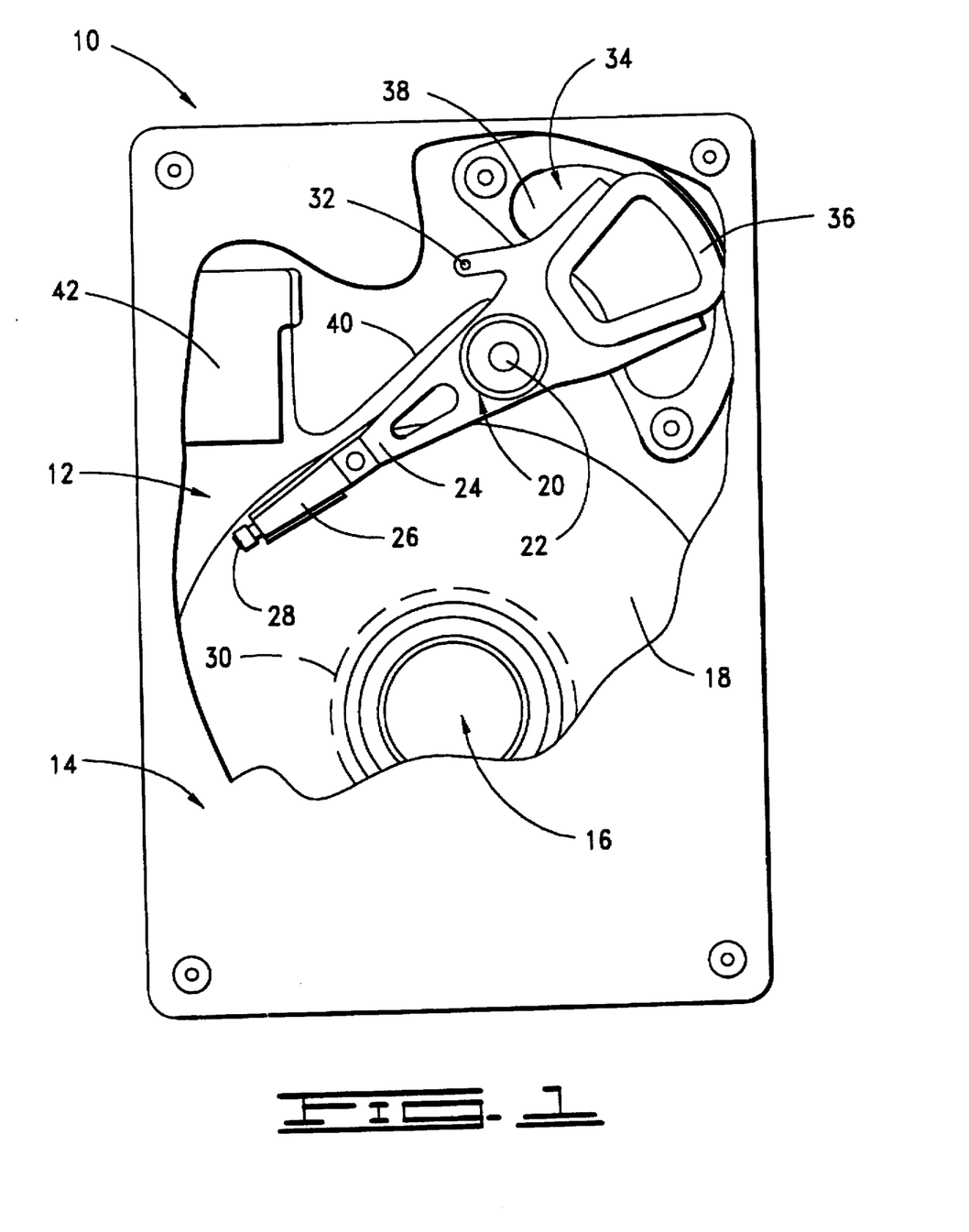
FIG. 1 is a top plan view of a disc drive in which the present invention is particularly useful.

Turning now to the drawings and more particularly to FIG. 1, shown therein is a top plan view of a disc drive 10 in which the present invention is particularly useful.

The disc drive 10 includes a laminated base deck 12 (hereinafter also referred to as "base deck") to which various disc drive components are mounted and a top cover 14, which is shown in a partial cut-away fashion to expose selected components of interest. Although not explicitly illustrated in the top plan view of FIG. 1, it will be readily understood that the base deck 12 includes an interior surface to which various disc drive components are mounted as well as side walls which, in combination with the top cover 14, provide sufficient height to house these components within a sealed internal environment. The structural characteristics of the laminated base deck 12 will be discussed in more detail hereinbelow.

Mounted to the base deck 12 is a spindle motor (shown generally at 16) to which a plurality of discs 18 are mounted for rotation at a constant high speed. Adjacent the discs 18 is an actuator assembly 20 (hereinafter sometimes also referred to as an "E-block") which pivots about a pivot shaft assembly 22 in a rotary fashion. The E-block 20 includes actuator arms 24 which support gimbal assemblies 26 (hereinafter also sometimes referred to as "load springs"). The load springs 26 in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the disc drive 10 is not in use, the heads 28 are moved to landing zones (denoted at broken line 30), which are located in FIG. 1 near the inner diameter of the discs 18.

It will be recognized that the E-block 20 is provided with a latching arrangement (shown generally at 32) to secure the E-block 20 when the disc drive 10 is not in use. For a general discussion of typical E-block latching arrangements, see U.S. Pat. No. 5,231,556 entitled SELF-HOLDING LATCH ASSEMBLY, issued Jul. 27, 1993 to Blanks, assigned to the assignee of the present invention and incorporated herein by reference.

Continuing with FIG. 1, the E-block 20 is controllably positioned by way of a voice coil motor (VCM, shown generally at 34), comprising an actuator coil 36 immersed in the magnetic field generated by a permanent magnet 38. It will be recognized that a magnetically permeable flux path (such as a second permanent magnet in conjunction with a steel plate) is mounted above the actuator coil 36 to complete the magnetic circuit of the VCM 34, but for purposes of illustration this flux path has not been shown in FIG. 1. When controlled DC current is passed through the actuator coil 36, an electromagnetic field is set up which interacts with the magnetic circuit of the VCM 34 to cause the actuator coil 36 to move relative to the permanent magnet 38 in accordance with the well-known Lorentz relationship. As the actuator coil 36 moves, the E-block 20 pivots about the pivot shaft assembly 22, causing the heads 28 to move across the surfaces of the discs 18.

To provide the requisite electrical conduction paths between the heads 28 and disc drive read/write circuitry (not shown), head wires (not separately shown) are routed on the E-block 20 from the heads 28, along the gimbal assemblies 26 and the actuator arms 24, to a flex circuit assembly 40. The head wires are secured (by way of a suitable soldering process) to corresponding pads (not separately designated in FIG. 1) of the flex circuit assembly 40. In turn, the flex circuit assembly 40 is connected to a flex circuit bracket (shown generally at 42) in a conventional manner and communication is provided between the flex circuit bracket 42 and a printed circuit board (PCB) mounted to the underside of the disc drive 10 (the PCB is not shown in FIG. 1).

Figure 2:
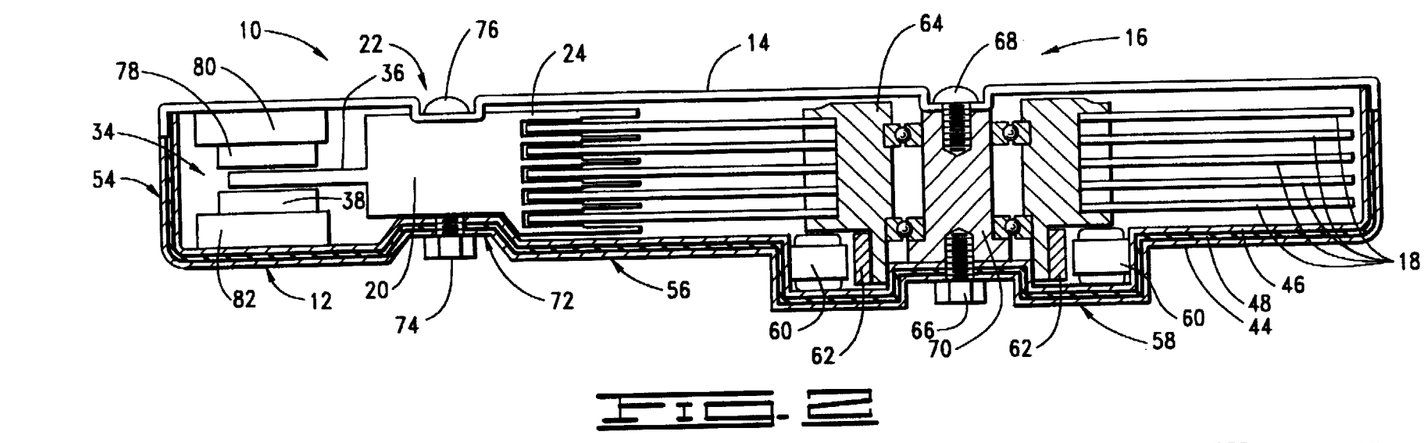
FIG. 2 is a cross-sectional view of the disc drive of FIG. 1, showing features of the laminated base deck of the present invention.

Referring now to FIG. 2, shown therein is a cross-sectional view of the disc drive 10 of FIG. 1. More particularly, FIG. 2 shows the base deck 12 to comprise a laminated composite having multiple layers of integrally formed material. As shown in FIG. 2, the laminated base deck 12 includes structural layers 44 and 46 preferably comprising stainless steel and a core layer 48 preferably comprising a resilient material, such as a polymer or an adhesive. The overall thickness and dimensions of the laminated base deck 12 are generally contemplated as being similar to conventional, cast base decks (that is, having a wall thickness of from about 0.060" to about 0.100").

As shown in FIG. 2, the base deck 12 includes generally vertical side walls 54 and a generally horizontal base portion 56. The top cover 14 engages with the side walls 54 as shown to form the requisite sealed environment for the disc drive 10.

The base portion 56 of the base deck 12 supports the spindle motor 16 and the actuator assembly 20. More particularly, a boss 58 is provided in the base portion base portion 56 to accommodate a plurality of stationary coils 60 of the spindle motor 16. Permanent magnets 62 are mounted to a rotatable hub 64 of the spindle motor 16 to which the discs 18 are attached. Thus, as will be recognized by those skilled in the art, the coils 60 are selectively energized to generate magnetic fields which interact with the magnetic fields of the permanent magnets 62 in order to rotate the discs 18 in the desired direction at the desired speed. Fasteners 66 and 68 are provided to secure a spindle motor shaft 70 to the base deck 12 and the top cover 14, respectively.

Additionally, the base portion 56 of the base deck 12 includes a beveled portion 72 which supports the attachment of the actuator assembly 20. More particularly, fasteners 74 and 76 are provided to secure the pivot shaft assembly (22, of FIG. 1) of the actuator assembly 20 to the base deck 12 and the top cover 14, respectively.

The actuator assembly 20 thus rotates about the pivot shaft assembly 22 in accordance with the operation of the VCM 34, which comprises the actuator coil 36 and the permanent magnet 38 of FIG. 1, as well as a second permanent magnet 78 and steel plates 80 and 82. For purposes of clarity, the gimbal assemblies 26 and heads 28 of the actuator assembly 20 have been omitted from FIG. 2.

The laminated base deck 12 is fabricated from a flat laminated sheet which is deep drawn to provide the shape shown in FIG. 2. That is, using a suitable punch-forming operation, the side walls 54, base portion 56, boss 58 and beveled portion 72 of the base deck 12 are preferably formed from a single piece of laminated material. It will be recognized by those skilled in the art that the composition and thickness of the structural layers 44 and 46 and the core layer 48 should be chosen so that structural integrity of the finished base deck 12 is achieved without excessive deformation of the laminate.

Additionally, the interior structural layer 46 is preferably thicker than the exterior structural layer 44 in order to facilitate subsequent machining operations on critical surfaces of the interior of the base deck 12. It will be recognized that the side walls 54 and the base portion 56 may be formed during a different operation than that used to form the boss 58 and the beveled portion 72. Alternatively, the entire base deck 12 may be formed during the same operation.

It will be recognized that the laminated base deck 12 will have improved damping (as a result of the core layer 48) as compared to conventional, cast base decks. However, an advantage with the prior art use of a casting process over the above described deep draw process to form the base deck 12 is the ability in a casting process to form the requisite features necessary to attach and support the base deck 12 in a user environment. As will be recognized, prior art disc drives using cast base decks typically included standoffs having threaded holes to secure the disc drives to the user environments. The laminated material used in the base deck 12, though, will generally not possess the necessary structural rigidity and thickness to directly accommodate hardware from the user environment. Additionally, features such as standoffs are not readily formed from a deep draw process. Thus, the manner in which the laminated base deck 12 is secured to the user environment will be addressed as follows.

One methodology that could be used the secure the laminated base deck 12 of FIG. 2 to a user environment is through the use of an external chassis, such as disclosed in copending U.S. patent application Ser. No. 08/671,704, incorporated hereinabove. Such a chassis is shown in FIG. 3, which shows a one-piece chassis 90 in conjunction with the laminated base deck 12 and a printed circuit board 92.

The chassis 90 comprises a chassis base portion 94 having substantially the same size and shape as the base portion 56 of the base deck 12. Additionally, curved flanges 96 are provided along selected edges of the chassis base portion 94. The curved flanges 96 define U-shaped channels which enhance the strength of the chassis 90 along the length of the chassis 90. Further, as described below, the curved flanges 96 provide a C-shaped slot to accommodate the PCB 92. Inwardly directed tabs 98 extend from the curved flanges 96 to accommodate tapped holes 100, which extend through the curved flanges 96 and the tabs 98 as shown. The tapped holes 100 facilitate mechanical attachment of the disc drive 10 to the user environment by way of threaded fasteners (not shown). The configuration of the tabs 98 and the holes 100 will be discussed in greater detail hereinbelow; generally, however it will be recognized that the laminated base deck 12 is mounted to the user environment by way of the chassis 90.

Figure 3:
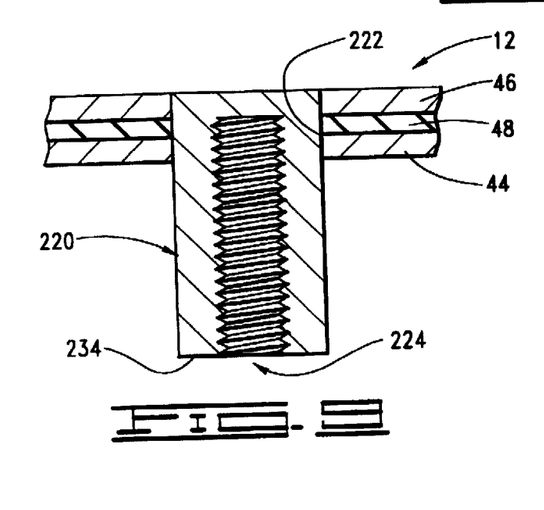
FIG. 3 is an isometric, exploded view of the disc drive of FIG. 1 in conjunction with an external chassis and printed circuit board, showing one methodology for the mounting of the drive in a user environment.

The chassis base portion 94 is further shown in FIG. 3 to include a central opening 102 sized to accommodate the boss 58 of the base deck 12.

Finally, the PCB 92 houses electronic components (not shown) used by the disc drive 10. As with the chassis 90, the PCB 92 includes a central opening 104 sized to accommodate the boss 58 of the base deck 12. Additionally, notches 106 are provided on the edges of the PCB 92 as shown to accommodate the hardware (not shown) used to secure the chassis 90 to the user environment.

A PCB external connector 108 is provided at one end of the PCB 92, in order to provide power and communications connections from a host system (not shown) to the disc drive 10. PCB mounting holes 110 are provided through which hardware (not shown) is inserted to mount the PCB 92 to the base deck 12 (by way of through-holes 112 in the chassis 90 and threaded holes 114 in the base deck 12). Additionally, a PCB internal connector (the bottom of which is shown at 116) mates with connector pins 118 from the base portion 56 of the base deck 12 to make the necessary electrical interconnections between the PCB 92 and the components housed within the base deck 12. A corresponding connector opening 120 is provided in the chassis 90 to accommodate the connector 116 and the connector pins 118.

Figure 4:
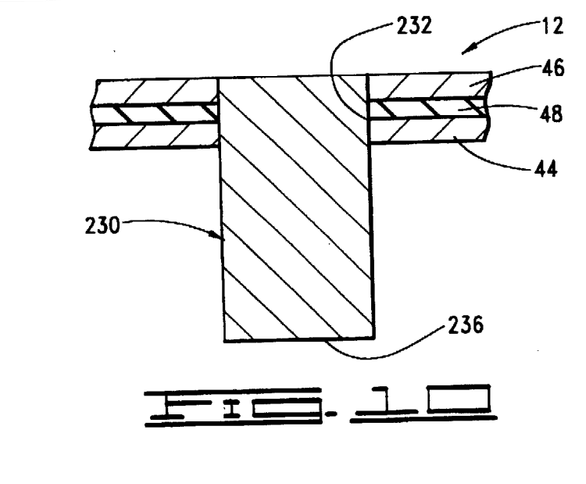
FIG. 4 is an end, elevational view of the disc drive of FIG. 3.

Having concluded a description of the respective features of the laminated base deck 12, the chassis 90 and the PCB 92, the manner in which these components are integrated will now be discussed, with reference to FIG. 4. FIG. 4 provides an elevational end view of the disc drive 10 of FIG. 1 utilizing the chassis 90 of FIG. 3. For purposes of clarity, the connector pins 118 of the base deck 12 and the connectors 108, 116 of the PCB 92 have been omitted from FIG. 4.

As shown in FIG. 4, preferably disposed between the chassis 90 and the base deck 12 is a vibro-acoustic isolator 122, comprising a thin layer of damping material substantially conforming to the surfaces of the base portion 56 of the base deck 12 and the chassis base portion 94 of the chassis 90. The isolator 122, in conjunction with the chassis 90, further operates to isolate the disc drive 10 from high frequency external vibrations and suppress the generation of acoustic noise. It will be recognized that the chassis 90 and the isolator 122 can be viewed as additional laminate layers to the layers 44, 46 and 48 of the base deck 12 (as shown in FIG. 2).

The isolator 122 preferably comprises a layer of pressure sensitive adhesive (PSA) from about 1 to 10 mils thick. However, non-adhesive materials having appropriate damping properties, such as rubber or plastic, may also be used in place of PSA.

During assembly, the PCB 92 is mated with the chassis 90 by inserting the end of the PCB 92 opposite the connector 108 into the C-shaped slot defined by the chassis 90 and sliding the PCB 92 down the slot until the PCB 92 is aligned with the chassis 90. The isolator 122 is preferably applied to the base portion 56 of the base deck 12 and the assembled chassis 90 and PCB 92 are subsequently mounted to the base portion 56, "sandwiching" the isolator 122. The PCB 92 is then secured as provided hereinabove to the base deck 12 by way of PCB fasteners (not shown) and holes 110. Suitable spacers (not shown) can be readily used with the fasteners to secure the chassis 90 to the base deck 12 and maintain the desired relative spacing, as shown in FIG. 4. Additionally, the PCB 92 can be sized and shaped as desired to allow the chassis 90 to be attached to the base deck 12 before attaching the PCB 92. Such a configuration will allow the PCB 92 to be subsequently removed (such as during manufacturing) without necessitating the removal of the chassis 90.

It will be recognized that the use of PSA as the isolator 122 will generally operate to additionally secure the chassis 90 to the base deck 12, although subsequent removal of the chassis 90 from the base deck 12 (such as during manufacturing repair operations) with the use of double-sided PSA will generally be time consuming and necessitate destruction and replacement of the PSA. However, single-sided PSA could readily be used instead of double-sided PSA, in which case the single-sided PSA would be attached to either one of the base deck 12 or the chassis 90, thereby facilitating subsequent disengagement of the chassis 90 from the base deck 12. Further, additional mechanical locking arrangements (such as additional hardware and associated holes in the chassis 90 and the base deck 12) could readily be utilized to further secure the chassis 90 to the base deck 12. The material and thickness of the isolator 122, as well as the methodology used to secure the chassis 90 to the base deck 12, will generally depend upon the mechanical characteristics and performance requirements of a particular disc drive application.

Figure 5:
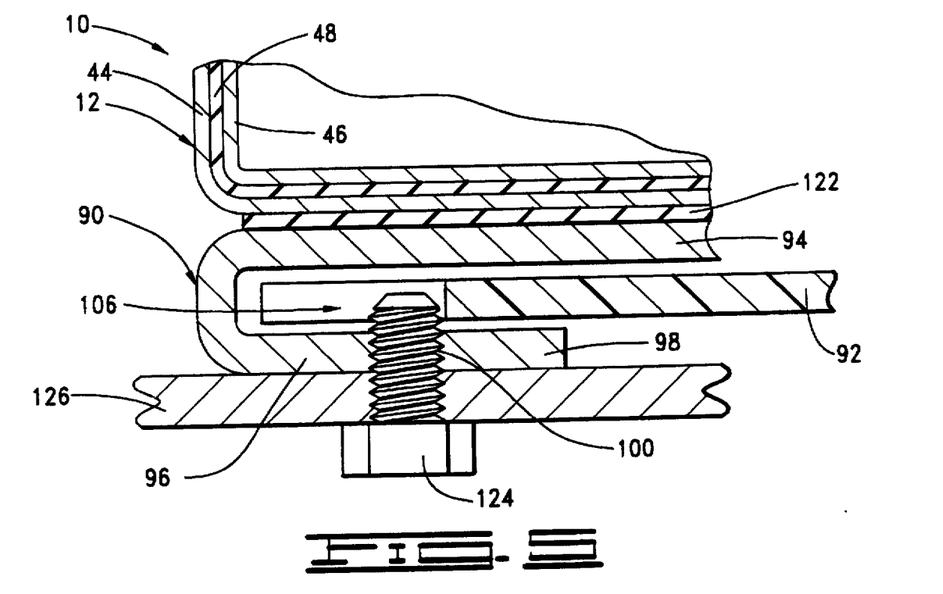
FIG. 5 is a cross-sectional view of the disc drive of FIG. 4, showing in greater detail the mounting of the drive in the user environment.

Turning now to FIG. 5, shown therein is a cross-sectional view of the laminated base deck 12, the chassis 90, the PCB 92 and the isolator 122, illustrating in greater detail the manner in which the disc drive 10 can be secured to the user environment by way of the chassis 90. More particularly, FIG. 5 shows a threaded fastener 124 which is secured through a base plate 126 of the user environment and the tapped hole 100 of the chassis 90. The end (not designated) of the threaded fastener 124 extends to the notch 106 in the PCB 92. In this manner, the chassis 90 operates to secure the base deck 12 to the user environment; moreover, the chassis 90 in cooperation with the isolator 122 provide additional vibro-acoustic isolation for the base deck 12.

Figure 6:
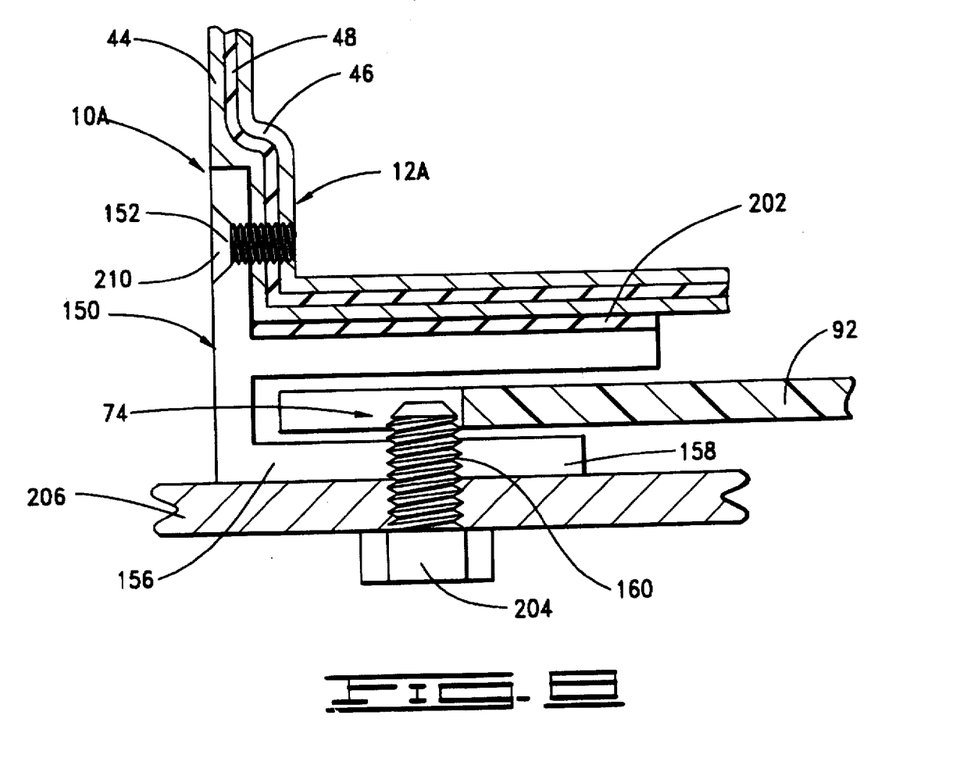
FIG. 6 is an isometric, exploded view of the disc drive of FIG. 1 modified to accommodate a two-piece external chassis, which provides an alternative methodology for the mounting of the drive in the user environment.

As an alternative to the one-piece chassis 90 of FIGS. 3–5, a two-piece chassis 150 can also be used to secure the laminated base deck 12 in a user environment, as shown in FIG. 6. Referring to FIG. 6, shown therein is an isometric, exploded view of the two-piece chassis 150 (hereinafter also referred to as "chassis 150") as part of a disc drive 10A. More particularly, the chassis 150 mates with a laminated base deck 12A and the PCB 92 of the disc drive 10A in a manner similar as described hereinabove. It will be noted that the disc drive 10A is similar in construction and operation to the disc drive 10 of FIGS. 1–5, with the exceptions as set forth hereinbelow. Thus, item numbers for corresponding components in FIGS. 1–5 have been used in FIG. 6.

Referring to FIG. 6, the chassis 150 is shown to comprise a pair of inverted F-shaped extrusions, each having a vertical rail 152 from which a base deck flange 154 and a PCB support flange 156 extend in a generally normal direction. The PCB support flanges 156 include tabs 158 which accommodate threaded holes 160 to facilitate mechanical attachment of the chassis 150 to the user environment by way of fasteners (not shown).

The vertical rafts 152 align with corresponding inset surfaces (one shown in FIG. 4 at 162) on the side walls 54 of the base deck 12A. Once installed, the vertical rails 152 are secured to the inset surfaces 162 by way of fasteners (not shown) using through holes 164 in the vertical rafts 152 and threaded holes 166 in the inset surfaces 162. The inset surfaces 162 can be machined into the laminated base deck 12A, or alternatively, the inset surfaces 162 can be formed from a suitable press operation. In either case, the preferred alignment of the chassis 150 and the base deck 12A is shown more particularly, with reference to FIG. 7.

Figure 7:
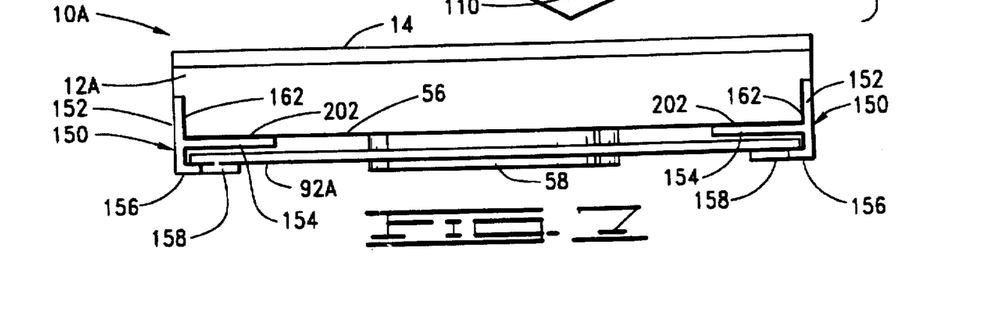
FIG. 7 is an end, elevational view of the two-piece chassis of FIG. 6 in conjunction with a disc drive similar to the disc drive of FIG. 6.

Referring to FIG. 7, shown therein is an elevational end view of the chassis 150 in conjunction with the disc drive 10A. More particularly, FIG. 7 shows the base deck 12A with the top cover 14, the chassis 150 and a PCB 92A integrally installed to form the disc drive 10A. As with FIG. 4, for purposes of clarity the connector pins 118 of the base deck 12A and the connectors 108, 116 of the PCB 92A have been omitted from FIG. 7.

FIG. 7 shows the base deck flanges 154 to be aligned proximate to the base portion 56 of the base deck 12A. Additionally, FIG. 6 shows the base deck flanges 154 and the PCB support flanges 156 to form U-shaped channels which support the PCB 92A.

Disposed between the base deck flanges 154 and the base portion 56 of the base deck 12A are vibro-acoustic isolators 202, which comprise thin layers of damping material substantially conforming to the adjacent surfaces of the base deck flanges 154 and the base portion 56. As with the isolator 122 described above, the isolators 202 are preferably PSA of from 1 to 10 mils in thickness. Additionally, single or double-sided PSA could advantageously be used as the isolators 202 in order to further secure the isolators 202 relative to the chassis 150 and the base deck 12A. It will be recognized, however, that suitable non-adhesive materials could readily be used for the isolators 202.

As with the one-piece chassis 90 described above, in integrating the components shown in FIG. 6 into the assembled disc drive 10A shown in FIG. 7, the PCB 92A is preferably inserted into the slot defined by the two-piece chassis 150 and then the chassis 150 and the PCB 92A are subsequently secured to the base deck 12A. Additionally, the PCB 92A can be sized and shaped as desired to facilitate subsequent removal of the PCB 92A without necessitating the removal of the chassis 150.

Turning now to FIG. 8, shown therein is a cross-sectional view of the laminated base deck 12A, the PCB 92A, the chassis 150 and the isolator 202, illustrating in greater detail the manner in which the disc drive 10A is secured to the user environment. As with the one-piece chassis 90 of FIG. 5, the chassis 150 of FIG. 8 is secured by way of a threaded fastener 204 which extends through a base plate 206 of the user environment and through the threaded hole 160 of the chassis 150.

Additionally, the vertical rail 152 is secured to the inset surface 162 of the laminated base deck 12A by way of beveled, threaded fasteners (one shown at 210).

Having concluded a discussion of the use of an external chassis (90 in FIGS. 3–5 and 150 in FIGS. 6–8), alternative methodologies for securing the laminated base deck 12 to the user environment will now be discussed.

Turning now to FIG. 9, shown therein is a threaded standoff 220, which is inserted into a corresponding hole 222 in the laminated base deck 12 (of FIG. 2) at a suitable location. As will be recognized, the standoff 220 can be welded or pressed into the hole 222 in order to integrate the standoff 220 into the base deck 12. The standoff 220 includes a threaded hole 224 sized to accommodate hardware (not shown) for the mounting of the base deck 12 into the user environment. It will be recognized that a plurality of such standoffs 220 can be provided as required to mount the base deck 12.

Additionally, as shown in FIG. 10, a solid standoff 230 can also be provided at selected locations of the laminated base deck 12. Particularly, the solid standoff 230 is inserted into a corresponding hole 232 in the base deck 12 and secured in a manner similar to that used to secure the threaded standoff 220 of FIG. 9. The solid standoff 230, while not accommodating hardware, does provide a level surface capable of supporting the base deck 12 with relation to the user environment, when used in conjunction with the threaded standoffs 220 of FIG. 10. It is expressly contemplated that supporting surfaces 234 and 236 of the threaded standoffs 220 and the solid standoffs 230, respectively, would be arranged so as to facilitate proper support and alignment of the base deck 12 when mounted in the user environment. Additionally, as it may be desirable to mount the disc drive 10 using hardware (not shown) oriented in a direction perpendicular with the side walls 54 of the laminated base deck 12, the threaded standoffs 220 can be alternatively provided with threaded holes (not shown) that extend through the sides of the standoffs 220.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a disc and an actuator assembly adjacent the disc, the actuator assembly including a head for selectively reading and writing data stored on the disc and a coil of a voice coil motor for selectively positioning the actuator assembly relative to the disc, the disc drive further having a spindle motor for controllably rotating the disc at a selected speed and a top cover, the improvement comprising:

a laminated base deck comprising a base portion and side walls extending from the base portion, the side walls engageable with the top cover to provide a sealed environment for the disc drive, the base portion supporting the spindle motor and the actuator assembly, the base portion and side walls deep drawn from a single piece of laminate and including an interior structural layer, an exterior structural layer and a core layer disposed between the interior and exterior structural layers, wherein the structural layers provide mechanical support for the disc drive and the core layer provides improved damping of vibrations generated by the operation of the spindle motor and the actuator assembly.

2. The improvement of claim 1, wherein the structural layers comprise layers of metal, and wherein the core layer comprises a layer of damping material.

3. The improvement of claim 2, wherein the layer of damping material comprises pressure sensitive adhesive.

4. The improvement of claim 2, wherein the structural layers comprise layers of stainless steel.

5. The improvement of claim 1, further comprising an external chassis mounted to the exterior surface of the base portion, the chassis including inwardly directed flanges for strengthening the chassis and accommodating a disc drive printed circuit board and attachment means for attaching the chassis to a user environment.

6. The improvement of claim 5, wherein the chassis comprises a c-shaped member comprising a chassis base portion substantially the same shape as the base portion of the laminated base deck, wherein the inwardly directed flanges extend from selected edges of the chassis base portion, and wherein the chassis base portion is proximately aligned with and secured to the base portion of the laminated base deck.

7. The improvement of claim 6, further including a vibro-acoustic isolator disposed between the chassis base portion and the exterior surface of the base portion of the laminated base deck.

8. The improvement of claim 7, wherein the isolator comprises a layer of pressure sensitive adhesive from about 1 to 10 mils in thickness.

9. The improvement of claim 5, wherein the chassis comprises a pair of rails, wherein each rail includes a vertical portion aligned with and secured to selected surfaces of the side walls of the laminated base deck and a base deck flange extending from the vertical portion, wherein each base deck flange is proximately aligned with the base portion of the laminated base deck and wherein a channel is formed between each base deck flange and each of the inwardly directed flanges, the channel accommodating a portion of the printed circuit board.

10. The improvement of claim 9, further including a vibro-acoustic isolator disposed between each base deck flange and the exterior surface of the base portion of the laminated base deck.

11. The improvement of claim 10, wherein the isolator comprises a layer of pressure sensitive adhesive of from about 1 to 10 mils in thickness.

12. The improvement of claim 1, further including threaded standoffs inserted into the laminated base deck at selected locations to mount the laminated base deck within a user environment.

13. The improvement of claim 12, further including solid standoffs inserted into the laminated base deck at selected locations to support the laminated base deck relative to the user environment.

14. A method for forming a base deck for a disc drive having a spindle motor and an actuator assembly, the method comprising the steps of:

providing a sheet of laminate comprising an interior structural layer, an exterior structural layer and a core layer disposed between the interior and exterior structural layers; and deep drawing the sheet of laminate to form a base portion and side walls extending from the base portion, the side walls mateable with a disc drive top cover to provide a sealed internal environment for the disc drive.

15. The method of claim 14, further comprising the step of forming a boss from a selected portion of the base portion of the base deck to support the disc drive spindle motor.

16. The method of claim 15, further comprising the step of forming a beveled portion from a selected portion of the base portion of the base deck to support the disc drive actuator assembly.

17. The method of claim 14, further comprising the step of inserting a threaded standoff in a selected portion of the base portion to mount the base deck within a user environment.

18. The method of claim 17, further comprising the step of inserting a solid standoff in a selected portion of the base portion to support the base deck relative to the user environment.

* * * * *

UNITED STATES PATENT AND TRADEMARK OFFICE
CERTIFICATE OF CORRECTION

PATENT NO. : 5,666,239
DATED : September 9, 1997
INVENTOR(S) : Kenneth L. Pottebaum It is certified that error appears in the above-indentified patent and that said Letters Patent is hereby corrected as shown below:

Column 6, line 14, delete "the secure the" and insert --to secure the--.

Signed and Sealed this

Twenty-ninth Day of September, 1998

Attest:

BRUCE LEHMAN

Attesting Officer

Commissioner of Patents and Trademarks